(12) United States Patent
Bar-Yaakov et al.

(10) Patent No.: US 8,067,497 B2
(45) Date of Patent: Nov. 29, 2011

(54) FLAME-RETARDANT FOR ENGINEERING THERMOPLASTIC APPLICATIONS

(75) Inventors: Yoav Bar-Yaakov, Lehavim (IL); Timothy Geran, Springfield, VT (US)

(73) Assignee: Bromine Compounds Ltd., Beer Sheva (IL)

( * ) Notice: Subject to any disclaimer, the term of this patent is extended or adjusted under 35 U.S.C. 154(b) by 295 days.

(21) Appl. No.: 10/541,668

(22) PCT Filed: Jan. 12, 2004

(86) PCT No.: PCT/IL2004/000029
§ 371 (c)(1),
(2), (4) Date: Dec. 27, 2005

(87) PCT Pub. No.: WO2004/063263
PCT Pub. Date: Jul. 29, 2004

(65) Prior Publication Data
US 2006/0148948 A1 Jul. 6, 2006

(30) Foreign Application Priority Data
Jan. 13, 2003 (IL) .......................................... 153918

(51) Int. Cl.
*C08G 63/60* (2006.01)
*C08K 5/05* (2006.01)

(52) U.S. Cl. ....................................... 524/599; 524/380

(58) Field of Classification Search .................. 524/380, 524/599
See application file for complete search history.

(56) References Cited

U.S. PATENT DOCUMENTS

| | | | |
|---|---|---|---|
| 3,660,318 A | 5/1972 | Takuji et al. | |
| 4,562,216 A | 12/1985 | Kishida et al. | |
| 4,994,515 A | 2/1991 | Washiyama et al. | |
| 5,250,590 A | 10/1993 | Nakai et al. | |
| 5,376,718 A | 12/1994 | Yada | |
| 5,837,799 A | 11/1998 | Chen et al. | |
| 5,916,936 A | 6/1999 | Sagane et al. | |
| 2001/0009944 A1 * | 7/2001 | Chisholm et al. | 524/494 |

FOREIGN PATENT DOCUMENTS

| | | |
|---|---|---|
| CN | 1148605 | 11/1998 |
| CN | 1163907 | 6/1999 |
| JP | 62 004737 | 1/1987 |
| JP | 1 170630 | 7/1989 |
| JP | 1-287132 | 11/1989 |
| JP | 03-203954 | 9/1991 |
| JP | 04-013749 | 1/1992 |
| JP | 04-013749 A | 1/1992 |
| JP | 04-224851 A | 8/1992 |
| JP | 05-093120 | 4/1993 |
| JP | 5-117463 | 5/1993 |
| JP | 05-239269 | 9/1993 |
| JP | 06-145533 A | 5/1994 |
| JP | 06-299007 | 10/1994 |
| JP | 06-306162 | 11/1994 |
| JP | 06-345935 A | 12/1994 |
| JP | 09-124839 A | 5/1997 |
| JP | 2001310990 A * | 11/2001 |

OTHER PUBLICATIONS

International Search Report for PCT/IL2004/000029—3 pages.

* cited by examiner

*Primary Examiner* — Mark Eashoo
*Assistant Examiner* — Megan McCulley
(74) *Attorney, Agent, or Firm* — Roach Brown McCarthy & Gruber, P.C.; Kevin D. McCarthy

(57) ABSTRACT

This invention provides a flame retardant for polymeric compositions which is a mixture consisting of high molecular weight brominated epoxies modified with tribromophenol, having a low content of organic solvents. The invention further relates to a method for the preparation of the retardant, and to its use in flame retarded engineering thermoplastics having good chemical, thermal, and mechanical properties.

12 Claims, No Drawings

FLAME-RETARDANT FOR ENGINEERING THERMOPLASTIC APPLICATIONS

FIELD OF THE INVENTION

This invention relates to flame-retardant high molecular weight brominated epoxides modified with tribromophenol, and their application in engineering thermoplastics, resulting in thermoplastic compositions that are thermally stable and have high impact resistance, high melt flow index and low melt viscosity.

BACKGROUND OF THE INVENTION

The high molecular weight (HMW) brominated epoxides (BE) to which the invention refers have the general formula (I)

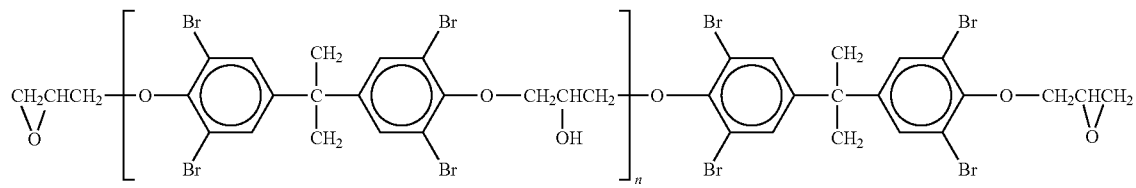

wherein n is an integer.

They are end-capped by glycidyl groups. This invention is concerned with HMW BEs modified with tribromophenol (TBP). If both of the end glycidyl groups are substituted by tribromophenyl-oxo-2-hydroxypropyl groups, the resulting compounds are phenoxy compounds which have the general formula (II)

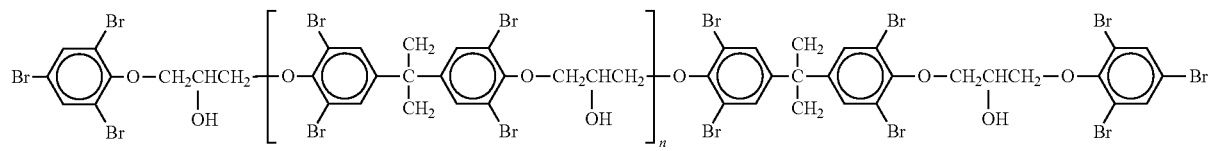

wherein n is an integer.

However, it may be that only one of the end groups is substituted, resulting in compounds having the general formula (III)

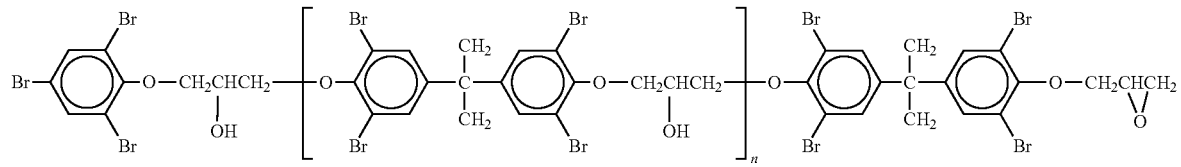

wherein n is an integer.

Mixtures of compounds of formula (I) and/or (II) and/or (III), wherein at least 80 mol % of the end groups are tribromophenyl-oxo-2-hydroxypropyl groups and at most 20 mol % of the end groups are glycidyl groups, will be called herein "fully modified" or "fully end-capped" (HMW MBEs).

Brominated epoxides, unmodified or partly or fully modified with tribromophenol are known in the art. Japanese Laid-open Patent Publication 1-287132 discloses styrene compositions comprising halogenated compounds having epoxy groups at both ends. Japanese Laid-open Patent Publication 5-117463 discloses styrene compositions comprising halogenated epoxides. Japanese Laid-open Patent Publications 62-4737 and 63-73749 disclose a fire-retardant mixture comprising more than 60% of halogenated epoxy fully modified with TBP. Japanese Laid-open Patent Publication 1-170630 discloses using as fire retardant compound a low molecular weight brominated compound 50% end-capped with TBP. All the above compositions are defective in light resistance, heat stability or other properties. U.S. Pat. No. 5,837,799 proposes as a fire retardant compound a mixture of HMW BE unmodified, modified at one end with tribromophenol, and fully modified (20 to 35 mol % is fully capped with tribromophenol). This mixture however is defective in that it will cause gel formation (by cross-linking) when processed with engineering thermoplastics such as polyamides, thus impairing the processing steps.

Low Molecular Weight (LMW) BEs have low viscosity and therefore it is relatively easy to reduce the volatile content to very low levels by using equipment which is known to those skilled in the art. On the other hand, HMW MBEs are very viscous, even at higher temperatures, and it is therefore very difficult to reduce the volatile content to very low levels. It is therefore advantageous to use LMW BEs with very low volatile content as a starting material for the production of HMW MBEs. Japanese Laid-open Patent Publication 2001-310990 discloses BE which may be fully modified with TBP and discloses a method that requires the use of solvents in the polymerization stage to produce HMW MBEs. The compositions obtained according to its teachings are defective because the flame retardant is prepared in an organic solvent and therefore necessarily contains a significant amount of organic volatiles. These volatiles cause metal corrosion and failure of metallic parts which are near to or in close contact with the flame-retarded engineering thermoplastics.

It is therefore a purpose of this invention to provide flame retardant and flame-retarded compositions, which are free from the defects of the prior art.

It is another purpose to provide flame-retarded engineering thermoplastic compositions which have high impact resistance.

It is a further purpose to provide flame-retarded engineering thermoplastic compositions which have high melt flow index and low melt viscosity and maintain these properties under long residence time at high processing temperatures.

It is a further purpose to provide flame-retarded engineering thermoplastic compositions which minimize corrosion of metallic parts that are near to or in close contact with the thermoplastics.

SUMMARY OF THE INVENTION

The invention provides a flame retardant which comprises fully modified BEs, viz. a mixture of compounds of formula (I) and/or (II) and/or (III) in which at least 80 mol %, preferably from 85 to 100 mol %, of the end groups are tribromophenyl-oxo-2-hydroxypropyl groups and at most 20 mol %, preferably from 0 to 15 mol % of the end groups are glycidyl groups. The flame retardants of the invention additionally have the following characteristics:
 high molecular weight (between 7,000 and 50,000—Dalton—preferably more than 7,000 and less than 30,000);
 free tribromophenol content less than 0.1 wt % of the whole flame retardant;
 organic solvents, with boiling point lower than 250° C., less than 100 ppm, and preferably less than 50 ppm, of the whole flame retardant.

The said flame retardants also have preferably an acid number less than 1 mg KOH/g and preferably less than 0.5 mg KOH/g of the whole flame retardant and an epoxy equivalent more than 10,000.

The high molecular weight BEs of the invention fully modified by tribromophenol will be briefly indicated hereinafter by the initial HMW MBE.

In a preferred embodiment of the invention, the HMW MBE comprise from 70 to 100 mol % of modified BEs of formula (II), from 30 to 0 mol % of partly modified BEs of formula (III), and from 10 to 0 mol % of unmodified BEs of formula (I).

Another aspect of the invention is a method for preparation the HMW MBEs. Said method comprises the steps of reacting low molecular weight brominated epoxide (LMW BE), having low volatile content, with tetrabromobisphenol-A (TBBA) and tribromophenol (TBP) in the presence of a catalyst. The molecular weight of the LMW BEs is between 650 and 3,500 Dalton. The reaction takes place without any solvent at a temperature of 100 to 250° C., preferably 100 to 200° C. TBP can be replaced totally or partly by tribromophenylglycidyl ether.

Another aspect of the invention are polymeric compositions comprising a base polymer chosen from among polyesters, such as but not limited to polyethylene terephthalate or polybutylene terephthalate, or mixtures thereof, or polyamides or polycarbonate and its alloys, and comprising the HMW MBEs of the invention.

A further aspect of the invention is a polymeric composition that also contains hindered phenol antioxidant.

Said polymeric compositions may also comprise fillers and/or glass reinforcement and/or antioxidants and/or lubricants and/or pigments and/or antidripping agents such as polytetrafluoroethylene-based systems and/or grades of talc that act as nucleating agents and that reduce the injection molding cycle time.

The polymeric compositions of the invention have a higher melt flow index and a lower melt viscosity, even under long residence time at high processing temperatures, than compositions containing comparable unmodified BEs. This property is particularly important in the production of objects with glass reinforced engineering plastics such as PBT, PET, or polyamides, as usually very thin walls and light weights are targeted. The high molecular weight flame retardant also contributes to the high processing heat stability needed for these types of products.

It was moreover found, on the contrary of what would have been expected, that these high molecular weight MBEs according to the invention, do not cause any decrease of the melt flow rate (MFR) while increasing residence time at high temperature, unlike what is observed with corresponding high molecular weight (between 7000 and 40,000 Dalton) BEs. This property is of particular interest for applications where materials are processed with long residence time or repeated heating during the complete series of processing steps, such as compounding, injection molding, and often, recycling of scraps. When high molecular weight (between 7000 and 40,000 Dalton) BEs are used, a significant increase in melt viscosity (reduction in MFR) of the plastic compound is observed with increasing residence time at high temperature. The reduced MFR results in serious limitations in injection molding properties; it may become impossible to produce articles of thickness such as 0.4 to 1.6 mm; it may increase injection molding cycles, increasing the cost of production; and it may limit the loading in scraps coming from previous production as they would increase too much the viscosity of the melt.

Low molecular weight modified BEs having a low softening range are usually difficult to compound directly with a base polymer because when they are added in the extrusion compounding machine, at high temperature, they start to soften and melt and consequently they stick onto the wall of the hopper, causing bridging later on, which will interrupt good compounding conditions. To avoid this kind of problem, producers are often obliged to prepare in advance pellets of a masterbatch concentrate containing high loading of low molecular weight modified BE, and this results in increasing cost and a detrimental effect on the final properties of the plastic composition. The HMW MBEs of the invention can be added directly as is, in a powder form, into the extrusion compounding machine, without causing any problem of softening or bridging, and thereby enabling easy and constant compounding conditions. Moreover, compounding operations of engineering thermoplastic compositions containing low molecular weight modified BEs are very difficult as they cause overlubrication and exude out of the blend, making deposits on the screw and on the barrel of the extruder. This problem is solved by the use of HMW MBEs.

DETAILED DESCRIPTION OF PREFERRED EMBODIMENTS

The following Examples 1 and 2 describe the preparation of modified high molecular weight brominated epoxy resins end-capped with tribromophenol.

EXAMPLE 1

This example describes the preparation of HMW MBEs, having a low content of volatiles, according to the invention (F-3100 LG). A 1 liter glass reactor was equipped with heating mantle, thermometer, stirrer and nitrogen inlet. Into the reactor, 664 g of low molecular weight brominated epoxy resin (LMW BE) made from tetrabromobisphenol A (TBBA) and epichlorohydrine was introduced, said resin being characterized by the following properties:

| | |
|---|---|
| Epoxy equivalent weight (EEW) | 477 g/equivalent, and |
| Volatile content | 21 ppm w/w methyl isobutyl ketone (MIBK). |

The said LMW BE had the formula (I) given hereinbefore.

The air in the reactor was replaced by nitrogen and the LMW BE was heated, it melted at 80° C., and the heating was continued to 150° C. Then stirring was started and 323.6 g of TBBA, made by Bromine Compounds Ltd. and designated as FR 1524, and 0.03 g tetrabutyl phosphonium bromide were added, followed by 52 g tribromophenol. The temperature of the reaction mixture was reduced to 100° C. and then rose exothermally to 170° C. in 45 minutes. The reaction mixture was poured into an aluminum tray and was placed in an oven heated to 170° C. After 6 hours, the tray was removed from the oven and allowed to cool to room temperature. The obtained product block was grounded and analyzed, and the following properties were measured:

| | |
|---|---|
| Weight average molecular weight | 16050 Dalton |
| Number average molecular weight | 10100 Dalton |
| Softening point | 187° C. |
| Volatile content (measured by gas chromatography) | 13 ppm MIBK |
| Bromine content | 53.1 wt % |
| EEW | 27000 g/equivalent |
| Acid value | 0.07 mg KOH/g |
| % epoxy end groups | 18.5 mol % |

EXAMPLE 2

Comparative

This example describes the preparation of HMW MBEs (F-3100 R). The same procedure as described in Example 1 was repeated, but using LMW BE containing 470 ppm residual MIBK. Grounded and analyzed, the following properties were measured:

| | |
|---|---|
| Weight average molecular weight | 16150 Dalton |
| Number average molecular weight | 10200 Dalton |
| Softening point | 187° C. |
| Volatile content | 290 ppm MIBK |
| Bromine content | 53.1 wt % |
| EEW | 26000 g/equivalent |
| Acid value | 0.08 mg KOH/g |
| % epoxy end groups | 19.6% mol % |

As may be seen, most of the MIBK remained in the final product.

EXAMPLE 3

In this example it was attempted to remove dioxane solvent from tribromophenol end-capped high molecular weight brominated epoxide by subjecting it to high vacuum. Into a 1 liter flask of Rotavapor® (made by Buchi, Switzerland), 300 g F-3100 LG prepared as in Example 1 and 100 g dioxane were added. The flask was mounted on the Rotavapor® and dipped into an oil bath at 90° C. and rotated at a speed of 40 rpm. After five hours of heating, the temperature of the bath was raised to 170° C. for four hours and then to 200° C. for two hours. Sample no. 1 was taken. After an additional two hours at 200° C., sample no. 2 was taken. A vacuum pump was started and the vacuum raised gradually as the resin became very viscous and foamed, filling the flask. After six hours the pressure in the flask was 30 mmHg; the vacuum was released, and sample no. 3 was taken. The vacuum pump was then replaced by an oil pump and the vacuum was raised gradually to avoid too much foaming. After 6 more hours at 200° C. and vacuum of 4 mm Hg, the final sample, no. 4, was taken. The four samples were analyzed by gas chromograph for dioxane content. Results are summarized in the following table:

| | Sample No. | | | |
|---|---|---|---|---|
| | 1 | 2 | 3 | 4 |
| Dioxane content (ppm) | 74300 | 25600 | 3500 | 1900 |

As can be seen, even when employed lab conditions, it is difficult to remove the solvent from the high molecular weight epoxy resin.

The following Examples 4 to 8 illustrate the applications of HMW MBEs in polymeric compositions.

EXAMPLE 4

HMW MBE prepared according to Example 1 (F-3100 LG), and characterized by low organic volatiles, has been compared with a tribromophenol-modified oligomeric brominated epoxide having an average molecular weight of 2000 Dalton (trade name F-3020, produced by Bromine Compounds Ltd.) in glass reinforced polybutylene terephthalate (PBT). The compositions of the blends are given in Table I.

All the components of the blends have been compounded in a Berstorff co-rotating twin-screw extruder type ZR-25 with a ratio of length over diameter of the screws equal to 32. The processing conditions are as follows:

Processing Temperatures (° C.):

| Zone 1 | Zone 2 | Zone 3 | Zone 4 | Zone 5 | Zone 6 | Zone 7 | Zone 8 | Die |
|---|---|---|---|---|---|---|---|---|
| 180 | 220 | 240 | 250 | 260 | 260 | 265 | 270 | 270 |
| Screw rate: | 230 rpm | | | | | | | |
| Feed rate: | 10 Kg/h | | | | | | | |

The feeding was performed by a gravimetric feeding system K-SFS24 of K-Tron. A dry blend of PBT and antimony trioxide master batch concentrate, both in a pellet form, was fed via the pellets feeder, while the flame retardant was fed via the powder feeder. The glass fibers were introduced in the fifth section of the compounding extruder via the lateral feeder.

Very soon after the start of the compounding operation, the composition with F-3020 began causing bridging of the blend in the lower part of the feeding hopper, causing repeated interruption in the extrusion process. The replacement of F-3020 by F-3100 LG, produced according to the invention, keeping all the other components in the composition the same, solved the problem completely, and no more bridging was observed, eliminating the previous interruptions during production of the compound (Table I).

Moreover, the compounding operation with the F-3020 composition was very difficult, as F-3020 caused an overlubrication exuding out of the blend, making deposits on the wall of the screw and on the barrel of the extruder.

TABLE I

Compositions of the blends (wt %) and their behavior.

|  | Flame Retardant F-3100 LG | Flame Retardant F-3020 |
|---|---|---|
| PBT Celanex 2500 (Ticona) | 52.3 | 52.3 |
| Glass fiber pbt 1a 1 hr (Owens Corning) | 30 | 30 |
| Flame retardant | 13.5 | 13.5 |
| Antimony trioxide master batch concentrate (M0112-Kafrit) | 42 | 42 |
| Bridging in the feeding hopper of the compounding equipment | None | Significant bridging |

EXAMPLE 5

HMW MBE, prepared according to Example 1 (F-3100 LG) and characterized by low organic volatiles, has been compared with a non-modified polymeric brominated epoxide with a similar molecular weight (trade name F-2100, produced by Bromine Compounds Ltd.) and with a non-modified polymeric brominated epoxide with a significantly higher molecular weight (trade name F-2400H produced by Bromine Compounds Ltd.) in glass reinforced polybutylene terephthalate (PBT). The compositions of the blends are shown in Table II below. Compounding was made using the same equipment under the same conditions as in Example 4. Compounded strands were pelletized in a pelletizer 750/3, produced by Accrapak Systems Limited.

The pellets produced by pelletizing said three compositions have been tested by measuring their melt flow index, using a Melt Flow Indexer produced by Rosand and according to ASTM D 1238-82. It can be seen in Table II that the use of F-3100 LG, produced according to the invention, contributes to provide the glass reinforced PBT with a significant improvement in melt flow index, compared with both F-2100 and F-2400H that are non-modified polymeric brominated epoxide. A high melt flow index is an important advantage for glass reinforced PBT, as it produces thin wall parts with less weight, more complex shapes and in shorter cycle times.

Another advantage which can be seen in Table II is the fact that by increasing the residence time at the processing temperature of the melt flow indexer to 30 minutes, the melt flow index did not decrease for the composition containing F-3100 LG, while in the case of F-2100, an important reduction of the melt flow index was observed. This means that glass reinforced PBT compositions flame-retarded by F-3100 LG will keep low viscosity properties, even after long residence times in processing equipment such as injection molding machines, or after several processing steps, such as during the recycling of scraps, while in the case of F-2100, the increase of viscosity will render the processing conditions more difficult and it will limit the possibility of recycling of scraps.

The melt flow index of the composition containing F-2400H (molecular weight higher than the modified epoxides of the invention) is not affected by a long residence time at high temperature. This type of pellet, however, is very viscous and not suitable for the production of thin wall parts with a short cycle by injection molding.

Molded samples have been prepared from the compositions by injection molding in an Arburg injection molding machine type Allrounder 500-150-320S to measure properties. As can be seen in Table II, molded samples prepared from the composition according to the invention have the good flame retardancy and thermomechanical properties usually needed for the production of performing parts in the electronic and automotive industries.

TABLE II

Compositions and properties of the blends.

|  | Flame retardant type | | |
|---|---|---|---|
|  | F-3100 LG | F-2100 | F-2400H |
| Composition (wt %) | | | |
| PBT Celanex 2500 (Ticona) | 52.0 | 52.0 | 52.0 |
| Glass fiber PBT 1a 1 hr (Owens Corning) | 30 | 30 | 30 |
| Flame Retardant | 13.5 | 13.5 | 13.5 |
| Antimony trioxide | 4.2 | 4.2 | 4.2 |
| Irganox B-225 | 0.2 | 0.2 | 0.2 |
| Hostaflon TF207 (anti-dripping - Hoechst) | 0.1 | 0.1 | 0.1 |
| Melt flow index (250° C. - 2.16 Kg): | | | |
| After 5 min residence time, g/10 min | 33 | 27 | 19 |
| After 30 min residence time, g/10 min | 44 | 24 | 19 |
| Flame retardancy, $UL_{44}$ at specimen thickness of 0.8 mm: class | V-0 | V-0 | V-0 |
| Notched IZOD impact, J/m (ASTM D256) | 64 | 58 | 49 |
| Heat distortion temperature, ° C. (1820 kPa) (ASTM D646-72) | 202 | 202 | 201 |

EXAMPLE 6

This example illustrates another surprising effect derived from the application of high molecular weight tribromophenol-modified polymeric brominated epoxide prepared according to the invention as in Example 1 (F-3100 LG), characterized by low organic volatiles. Said effect is the increase of melt flow index of plastic compositions containing it, compared with non-modified polymeric brominated epoxide with similar high molecular weight (trade name F-2100, produced by Bromine Compounds Ltd.). This is a surprising effect, as low molecular weight tribromophenol-modified polymeric brominated epoxides (trade name F-3014 and F-3020, produced by Bromine Compounds Ltd.) do not contribute to an increase in melt flow index compared with similar low molecular weight non-modified brominated epoxide (trade name F-2016, produced by Bromine Compounds Ltd.) in plastics compositions. A comparative evaluation of melt indexes of plastic compositions is summarized in Table III. The pellets used for this comparison were prepared on the same equipment as the one used in Example 5. The increase in melt flow index properties is an interesting feature, as it allows improvement of the injection molding conditions of parts for the electronic and automotive industries.

In Table III, PBT stands for polybutylene terephthalate, and ABST for acrylonitrile-butadiene-styrene thermoplastic resin.

TABLE III

Compositions and properties of the blends.

|  | Flame retardant type | | | | |
| --- | --- | --- | --- | --- | --- |
|  | F-3100LG | F-2100 | F-3020 | F-3014 | F-2016 |
| Composition (wt %) | | | | | |
| Composition A (based on PBT resin) | 86.5 | 86.5 | — | — | — |
| Composition B (based on ABST resin) | — | — | 86 | 86 | 86 |
| Flame retardant | 13.5 | 13.5 | 14 | 14 | 14 |
| Melt flow index*, g/10 min | 33 | 27 | 14 | 15 | 15 |

*Composition A: 250° C. - 2.16 Kg
Composition B: 200° C. - 5 Kg

EXAMPLE 7

High molecular weight brominated epoxide are polymeric fire retardants recommended for use in engineering thermoplastics, such as polybutylene terephthalate (PBT) and polyester (PET). Such plastics have high levels of properties. In addition to good mechanical properties, they must have satisfactory processing characteristics and be stable during processing. HMW MBEs are preferred over non-modified brominated epoxide, as the former significantly reduce metal adhesion properties of the composition during compounding. Metal adhesion causes thermal degradation of stagnating parts sticking to the hot metallic parts of the compounding machine, which results in the appearance of black spots on the pellets. But still, these various types of brominated epoxides cause problems of corrosion of the metallic parts of the processing equipment, such as the compounding extruder or injection molding machine, when they are processed at very high temperatures. HMW MBE prepared according to Example 1 (F-3100 LG) and characterized by low organic volatiles significantly reduces the corrosion of the processing equipment.

Furthermore, such plastics need to be able to withstand conditions of use without losing properties or deteriorating in appearance. In many applications, they are required to meet stringent flame-retardancy standards, but not at the expense of their high performance capabilities. For instance, in applications such as relays, switches, connectors and circuit breakers, high corrosion resistance may be needed during the life cycle. Formulations based on high molecular weight brominated epoxide and/or modified polymeric brominated epoxide do not have sufficient corrosion resistance at high temperature of use. HMW MBE prepared according to Example 1 (F-3100 LG) and characterized by low organic volatiles has been compared with the tribromophenol end-capped brominated epoxy resin of Example 2 (F-3100 R), which contains higher concentrations of organic volatiles, and with a non-modified polymeric brominated epoxide with a similar molecular weight (trade name F-2100, produced by Bromine Compounds Ltd.) in glass reinforced polybutylene terephthalate (PBT). The compositions of the blends are shown in Table IV. Compounding was made using the same equipment and conditions as in Example 4.

Compounded strands were pelletized in a pelletizer 750/3 produced by Accrapak Systems Limited. These pellets have been used to measure corrosion resistance. Several methods to test corrosion of engineering thermoplastics have been developed, the most important ones being Amp test and the one developed by Siemens. In this example, a test similar to the Siemens test was used. According to this test, four types of metallic coupons (brass, silver plated brass, German silver and tin bronze) were placed in a 1 liter sealed flask containing 25 g of flame retarded PBT plastics. The flask was heated to 170° C. and maintained at this temperature in an oven for 15 days. The four metallic coupons were checked visually and classified between 1 and 8 relative to the level of corrosion—8 being fully corroded. In Table IV, one can find the results of the corrosion test for each type of flame retarded composition pellets.

TABLE IV

Compositions and corrosion properties of blends.

|  | Flame Retardant Type | | | |
| --- | --- | --- | --- | --- |
|  | F-2100 Ref | F-3100 R | F-3100 LG | F-3100 LG + antioxidant |
| Composition, wt % | | | | |
| PBT (Dupont) | 82 | 82 | 82.0 | 81.7 |
| Brominated flame retardant | 14 | 14 | 14 | 14 |
| Antimony trioxide | 4 | 4 | 4 | 4 |
| Hindered phenol antioxidant (Irganox 1010-Ciba Specialty) |  |  |  | 0.3 |
| Properties | | | | |
| Corrosion test, class | 6–7 | 5–6 | 3–4 | 2 |

The results summarized in Table IV show that the use of HMW MBE prepared according to Example 1 (F-3100 LG) and characterized by low organic volatiles significantly improves the corrosion resistance of the flame retarded plastic composition, compared with a product having higher volatile content (F-3100 R) and with a commercial grade of high molecular weight polymeric brominated epoxide (F-2100). A further improvement was obtained by the addition to the composition of hindered phenol type of antioxidant such as Irganox 1010 (Ciba Specialty).

EXAMPLE 8

HMW MBEs prepared according to Example 1 (F-3100 LG) and characterized by low organic volatiles have also the interesting property of permitting production of dust-free flame retardant systems that are 100% active with no need to use a polymeric carrier. Using the same equipment as in Example 4, it has been possible to produce pellets with the compositions described in Table V. If the flame retardant used as carrier is a low molecular weight tribromophenol modified polymeric brominated epoxide with a molecular weight below the limit defined according to this invention, it is possible to produce pellets with similar compositions. The use of the dust-free system according to the invention is very advantageous, as it eliminates the problem of feeding fine antimony trioxide powder and/or polytetrafluoroethylene (PTFE, used as a powerful antidripping agent) during the compounding steps. It is beneficial for the health of the workers. It is also advantageous in increasing productivity of the compounding line.

TABLE V

| Additive(s) Type | PTFE | Antimony trioxide | PTFE + Antimony Trioxide |
|---|---|---|---|
| Composition (wt %) | | | |
| F-3100 LG | 90 | 75 | 65 |
| PTFE (Hostaflon TF207 - Hoechst) | 10 | — | 10 |
| Antimony trioxide | 0 | 25 | 25 |

EXAMPLE 9

This example demonstrates the use of the flame retardant of the present invention in polyamides. HMW MBE prepared according to example 1 (F3100 LG) and characterized by low organic volatiles, has been compared with HMW polymeric brominated epoxy (trade name F2400 produced by Bromine Compounds Ltd) in glass fiber reinforced polyamide 66. The compositions of the blend are shown in Table VI below.

TABLE VI

| | Flame retardant type | |
|---|---|---|
| Composition (wt %) | F3100 LG | F-2400 |
| Polyamide 66 | 42.6 | 42.6 |
| Glass fiber | 30.0 | 30.0 |
| Flame retardant | 21.2 | 21.2 |
| Antimony trioxide | 4.24 | 4.24 |
| Other additives | 1.96 | 1.96 |

Compounding was performed using the same equipment as in example 4. Processing temperatures in the extruder were 230-285° C. Screw rate was 350 rpm, feeding rate was 17 kg/hr.

Molded samples have been prepared from the compositions by injection molding using the same equipment as in example 5. The properties of the molded compositions are summarized in table VII.

TABLE VII

Properties of FR GFR PA66 containing F-3100 & F-2400.

| | Flame retardant type | |
|---|---|---|
| Flammability: | F-3100 | F-2400 |
| Rating UL-94 at 1.6 mm | V-0 | V-0 |
| Rating UL-94 at 0.8 mm | V-0 | V-0 |
| Comparative tracking index (V) | 300–325 | 300–325 |
| Spiral flow* (inch) | 41.2 | 30.0 |
| HDT, ASTM D646 @1820 kPa (° C.) | 244.1 | 243.3 |
| Notched Izod Impact, ASTM D2244 (J/m) | 99.4 | 83.3 |
| Tensile strength at yield, ASTM D638 (MPa) | 172.9 | 178.5 |
| Tensile strength at break (MPa) | 172.8 | 178.5 |
| Elongation at break (%) | 2.1 | 2.6 |
| Tensile modulus (MPa) | 11408 | 10292 |

*as described in Encyclopedia of Polymer Science and Engineering, $2^{nd}$ edition, vol. 16, page 223, temperatures 240; 260; 280; 290; 300.

As can be seen from the table, both formulations have good mechanical and electrical properties with excellent flammability, but the product according to the present invention has better flow in the mold and higher impact strength.

While embodiments of the invention have been described by way of illustration, it will be understood that the invention may be carried out with many modifications, variations and adaptations, without departing from its spirit or exceeding the scope of the claims.

The invention claimed is:

1. A method for the preparation of a flame retardant (FR) for engineering thermoplastic compositions, said FR containing less than 100 ppm of organic solvents with boiling point lower than 250° C. and increasing melt flow index of said compositions while minimizing corrosion of metallic parts being in contact with said compositions, said FR being a high molecular weight brominated expoxide (HMW BE) comprising a mixture of compounds of formula (I) and/or formula (II) and/or formula (III):

Formula (I)
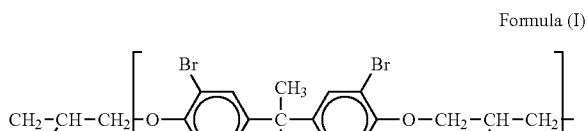
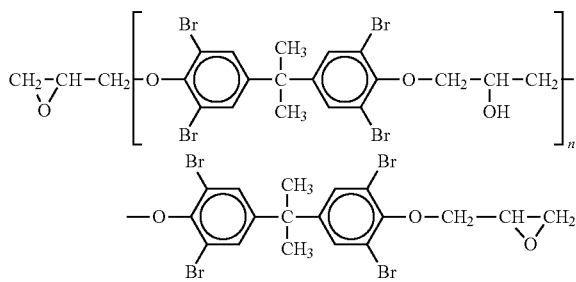

Formula (II)
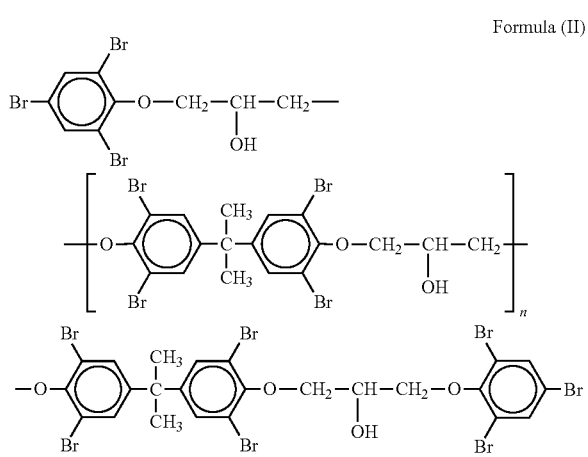

Formula (III)
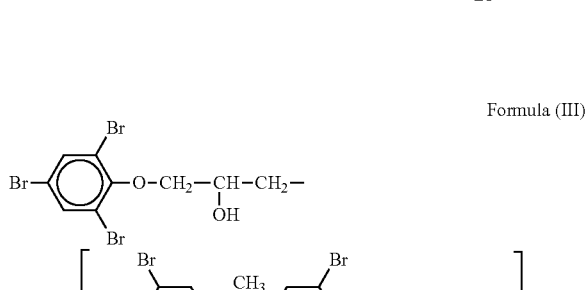
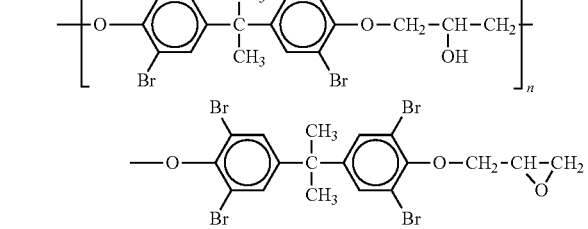

wherein n is an integer; and wherein at least 80 mol % of the end groups of all three formulae in the mixture are tribromophenyl-oxo-2-hydroxypropyl groups, and at most 20 mol % of said end groups are glycidyl groups;

said FR being characterized by a molecular weight of between 7,000 and 50,000 Daltons; and a free tribromophenol content less than 0.1 wt %;

wherein said method comprises the steps of:
a) preparing low molecular weight brominated epoxide (LMW BE) having a molecular weight of between 650 and 3,500 Daltons, and a content of organic solvents, with boiling point lower than 250° C., lower than 100 ppm of said LMW BE; and
b) reacting said LMW BE with tetrabromobisphenol-A (TBBA), and with a component selected from the group consisting of tribromophenol (TBP), tribromophenylglycidyl ether and a mixture thereof, in the presence of a catalyst, wherein said reaction takes place without addition of any solvent, at a temperature of from 100° C. to 250° C., said method being characterized in that it does not include any step of removing the solvent from said high molecular weight brominated expoxide.

2. A flame retardant (FR) for engineering thermoplastic compositions, said FR containing less than 100 ppm of organic solvents with boiling point lower than 250° C. while increasing melt flow index of said compositions and minimizing corrosion of metallic parts being in contact with said compositions, prepared according to the method claim 1, which comprises a mixture of compounds of formula (I) and/or formula (II) and/or formula (III):

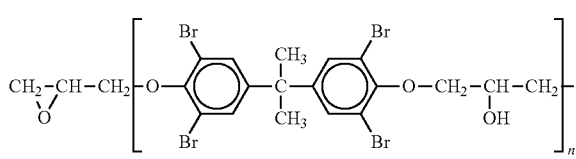

Formula (I)

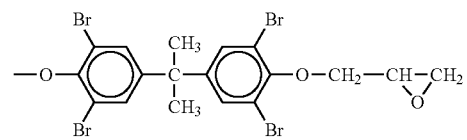

Formula (II)

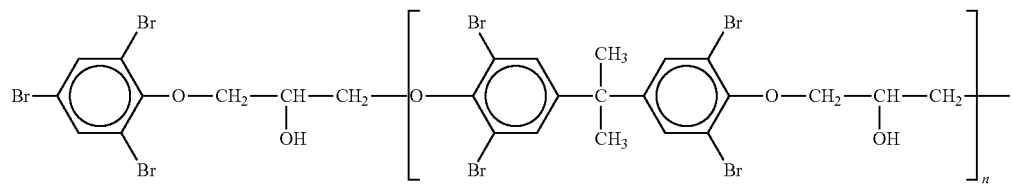

Formula (III)

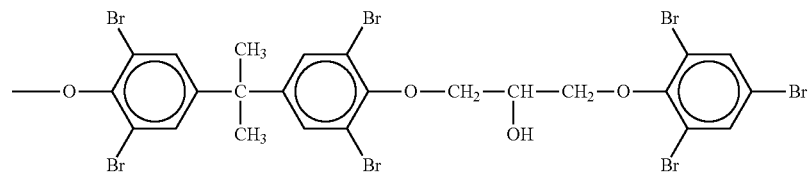

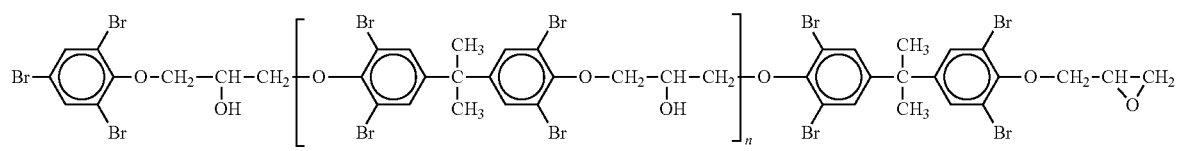

wherein n is an integer; and wherein at least 80 mol % of the end groups of all three formulae in the mixture are tribromophenyl-oxo-2-hydroxypropyl groups, and at most 20 mol % of said end groups are glycidyl groups;

said retardant being characterized by:
- i) a molecular weight of between 7,000 and 50,000 Daltons;
- ii) a free tribromophenol content less than 0.1 wt % of the whole flame retardant; and
- iii) a content of organic solvents, with boiling point lower than 250° C., lower than 100 ppm of the whole flame retardant.

3. A flame retardant according to claim 2, wherein 85 to 100 mol % of the end groups are tribromophenyl-oxo-2-hydroxypropyl groups and 0 to 15 mol % of the end groups are glycidyl groups.

4. A flame retardant according to claim 2, wherein the content of said organic solvents with boiling point lower than 250° C. is lower than 50 ppm.

5. A flame retardant according to claim 2, comprising from 70 to 100 mol % of modified brominated epoxides BEs of formula (II), from 30 to 0 mol % of partly modified BEs of formula (III), and from 10 to 0 mol % of unmodified BEs of formula (I).

6. A flame retardant according to claim 2, having molecular weight higher than 7,000 and lower than 30,000 Daltons.

7. A flame retardant according to claim 2, having an acid number less than 1 mg KOH/g.

8. A flame retardant according to claim 7, having an acid number less than 0.5 mg KOH/g.

9. A flame retardant according to claim 2, having an epoxy equivalent of more than 10,000.

10. A flame-retarded engineering thermoplastic composition, comprising a base polymer selected from the group consisting of polyethylene terephthalate, of polybutylene terephthalate, mixtures of polyethylene terephthalate with polybutylene terephthalate, polyamides, and polycarbonate or its alloys, and further comprising at least one flame retardant according to claim 2.

11. A flame-retarded engineering thermoplastic composition according to claim 10, further comprising hindered phenol antioxidants.

12. A flame-retarded engineering thermoplastic composition according to claim 10, further comprising fillers and/or glass reinforcement and/or antioxidants and/or lubricants and/or pigments and/or anti-dripping agents and/or grades of talc that act as nucleating agents and that reduce the injection molding cycle time.

\* \* \* \* \*